Dec. 8, 1953     A. FISHER ET AL     2,662,195
DYNAMOELECTRIC MACHINE
Filed May 27, 1952
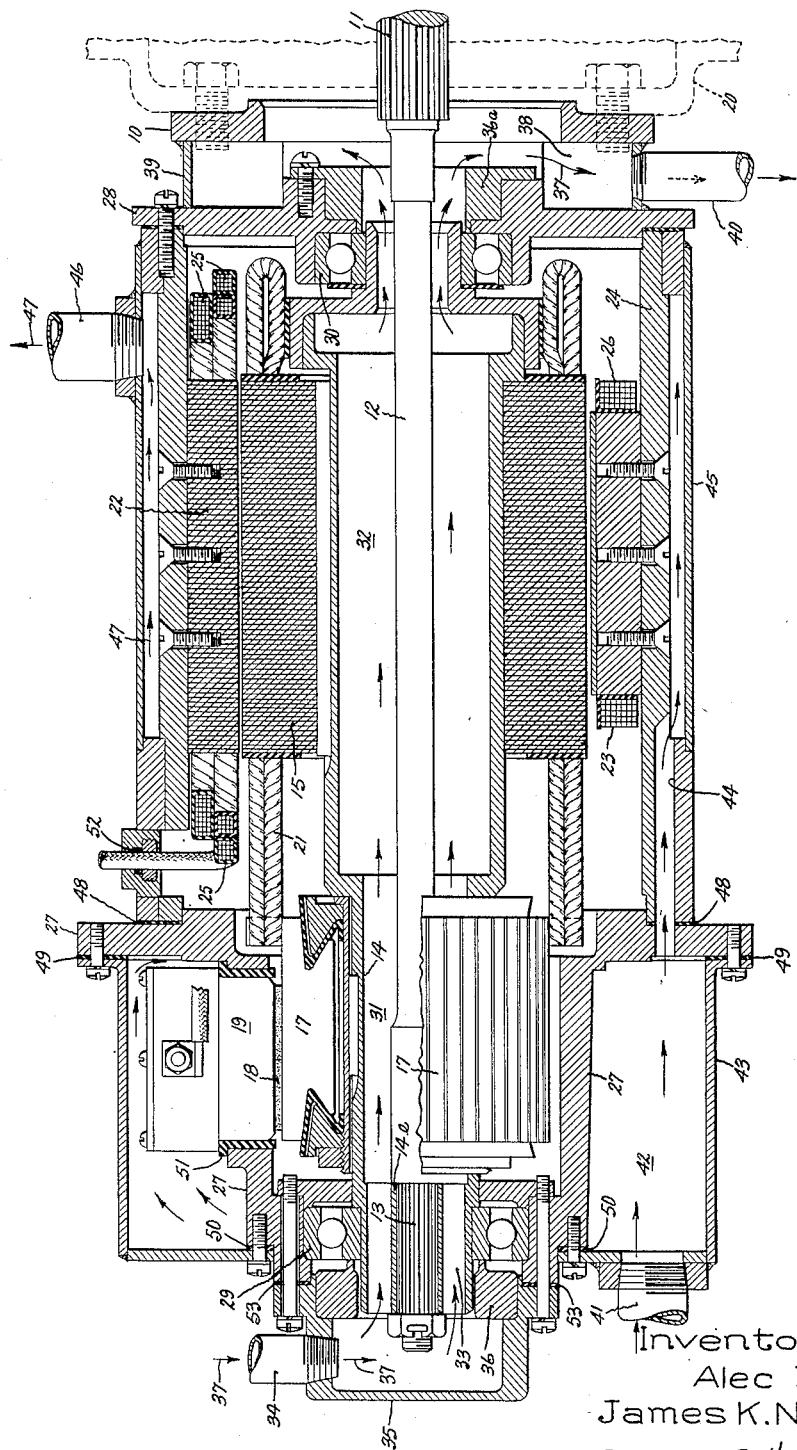
Inventors:
Alec Fisher,
James K. Newell,
by Richard E. Hosley
Their Attorney.

Patented Dec. 8, 1953

2,662,195

UNITED STATES PATENT OFFICE 2,662,195

DYNAMOELECTRIC MACHINE

Alec Fisher, Lynn, and James K. Newell, Swampscott, Mass., assignors to General Electric Company, a corporation of New York Application May 27, 1952, Serial No. 290,224

4 Claims. (Cl. 310—59)

Our invention relates to dynamoelectric machines and is particularly directed to a liquid cooled machine provided with a gas-filled collector enclosure and air gap.

Heretofore a considerable problem has existed in connection with dynamoelectric machines intended to be operable at high altitude. It is difficult to cool the machine with blast air on account of high ram air temperatures and low density of the rarefied air. Also, aboard high flying aircraft whenever a D.-C. generator or D.-C. motor of common type is used, the commutator brushes are subject to severe wear due to the dry and rarefied air, and whenever certain types of alternating current machines are used under similar conditions, the collector rings and collector ring brushes are subject to the same operating limitations. While numerous expedients have heretofore been proposed for overcoming the difficulties, for example, by submerging or supercharging a separate enclosure for the collector assembly, practically all of the prior art proposals with which we are familiar have required the use of large diameter rotating seals which prove troublesome due to leakage and which are very disadvantageous in increasing friction and heat losses. It has also been proposed in the past to submerge the entire high altitude dynamoelectric machine in a suitable fluid, but in most instances this is also disadvantageous in requiring troublesome seals between relatively rotating members and there are also additional rotational losses due to turbulence caused by the presence of liquid in the gap between the stator core and the rotor core.

It is an object of the present invention to provide simple and inexpensive means for overcoming the abovementioned difficulties.

A further object of the present invention is to provide a high altitude dynamoelectric machine having a collector assembly, a separate enclosure therefor, and means adapted to maintain a suitable cooling fluid in contact with certain parts of the machine together with seals primarily between relatively stationary parts which will resist the flow of such fluid into the separate collector enclosure and into the air gap of the machine.

Other objects and advantages will become apparent and our invention will be better understood from consideration of the following description taken in connection with the accompanying drawing showing a longitudinal elevation of a dynamoelectric machine such as an aircraft generator cut away to show its construction in accordance with the present invention.

We eliminate the problem of rotating seals in a fluid cooled frame structure entirely by providing a completely sealed commutator (or other collector) enclosure and a completely sealed air gap outside of which cooling fluid is additionally directed by means of baffles extending between relatively stationary parts, for example, from one end shield to collector enclosure and from the other end shield to the stator core and its windings. The completely sealed collector enclosure and air gap are filled with a conditioned gas, for example, with air conditioned with water vapor or another medium to provide suitable brush lubrication, or the enclosure can be filled with a gas under pressure from an external source. When filled with a gas under pressure, the entrance of liquids to the enclosure will be prevented and clearance type seals can be used. The gas can be replenished or cooled only by contact with metallic surfaces which themselves are cooled by the fluid supplied externally. For liquid cooling of the armature, small diameter rotating seals on the extreme ends of the machine are added to prevent leakage into the bearing enclosure. When a gas is used for rotor cooling, a clearance type rather than a rubbing type seal can be used.

Referring now to the drawing, we have shown an aircraft generator adapted as by having a flange portion 10 to be bolted to a prime mover 20. The generator is adapted to be driven by the prime mover through a spline 11 on an internal torque rod 12 provided, as is conventional in the art, to absorb torsional vibration. At the far end, the torque rod 12 is connected, through another splined end 13, with an outer quill shaft 14 which carries the rotor core member 15 and a current collector assembly comprising a commutator 17. The commutator is contacted by commutating brushes 18 held in stationary brush holders 19. The rotor core member 15 is provided with an armature winding 21 and is arranged to react electrodynamically with a stator core member comprising, in the illustrated embodiment, a plurality of main field poles 22 and commutating field poles 23 with the poles secured by a yoke or frame 24 and respectively provided with main pole windings 25 and commutating pole windings 26.

The main frame 24 is provided with end shields 27 and 28, respectively, which act as bearing housings supporting the outer shaft in anti-friction bearings 29 and 30. In accordance with the present invention, end shield 27 is configurated and arranged to enclose the commutator as hereinafter more fully explained. Very effective means for cooling the commutator and the rotor core are provided by enlarging the clearance between the hollow outer shaft and the inner shaft beneath the commutator and beneath the core as indicated by the chambers 31 and 32 surrounding the inner shaft. The spline engaging end 14e of the hollow shaft is provided with openings 33 to allow the admission of cooling fluid therethrough. This coolant may be introduced as through a conduit 34 communicating with an end cap 35 bolted to the end shield 27 and sealed from the bearings by an annular seal 36, so that the coolant, which may, for example, be a liquid entering through the conduits 34 in the direction indicated by the arrows 37, will pass through the openings 33 in the end of hollow shaft 14 and pass between this shaft and the inner shaft through chamber 31 absorbing heat from the commutator 17, and will pass also through the chamber 32 absorbing heat through metallic walls of the outer shaft from the rotor core 15 and pass on out under the bearing 30 to an end compartment 38, provided by an annular baffle 39 between the engine engaging mounting flange 19 and the end shield 28 of the generator, and finally pass out of the machine as through a conduit 40.

We also provide baffle and duct means for separately cooling the outside of the commutator assembly enclosure and the stator core, and in the illustrated embodiment such means comprises an inlet and an outlet with the inlet in the form of an inlet pipe 41 giving admittance to a chamber 42 provided by a removable outer wrapper 43 spaced from and extending around the commutator enclosing and bearing supporting end shield 27. From chamber 42 the coolant passes into a portion of the frame through axially extending passages 44 provided therein, and exhausts over the frame within a relatively thin metal enclosure 45 wrapped around the stator frame 24 and spaced from a major portion thereof in such a way that it not only contains the cooling fluid in close contact with the frame but also provides a support for an outlet pipe 46 for the same coolant. This coolant may, for instance, be a liquid following the path described, and indicated by arrows 47, and the liquid will not be likely to leak, that is, it will neither tend to enter the collector enclosure where it would act to insulate or short circuit the brushes, nor will it tend to enter the air gap portion to create turbulence therein, because both the collector enclosure (defined primarily by end shield 27 in the illustrated embodiment) and the air gap (which is defined between rotor core 15 and stator core poles 22 and 23) are completely baffled off from this coolant. To this end baffling means are provided comprising in the illustrated embodiment portions of the frame itself and at the collector end comprising the configuration of the associated end shield 27 extending around the collector assembly and sealed by a gasket 48 to the stator core within which the windings are located. If desired, the removable cover 43 surrounding and spaced from the collector enclosure may also be gasket sealed to the associated end shield as by annular gasket members 49 and 50, and sealing between brush holders and collector enclosing end shield 27 completed by gasketing 51 which also serves as an electrical insulator to prevent short circuiting between brush holders.

There is thus provided a device of the character described capable of meeting the objects hereinabove set forth. In operation of a machine designed in accordance with the invention, coolant will flow around the commutator shield and bearing support through passages and into and around the stator frame, with a separate coolant path through the inner bore of the outer shaft and with little chance for the coolant to enter into the collector enclosure where (whether it be an insulator or a conductor) it would interfere with commutation, or into the air gap where it would introduce rotational losses. The arrangement gives great freedom of design because either liquid or a gas such as air can be used for cooling purposes, or a combination of both may be used, without the necessity of worrying about any deleterious effect on commutation or air gap turbulence. With the arrangement of the invention, there are no running seals adjacent the commutator surface. The completely sealed collector enclosure and air gap may be filled with any gas at a suitable vapor pressure and there is little tendency for this gas to escape (as by expansion) because the gas is adequately cooled by contact with metallic surfaces which themselves are cooled by a fluid supplied externally. A seal between stationary members (such as that indicated at 52) may be readily provided to prevent escape of the air gap and collector chamber ambient from its enclosure adjacent the electrical leads of the machine and additional gaskets (such as that indicated at 53 adjacent cap 35) may also be provided where desired. It will be apparent that with the arrangement of the invention, all seals and baffles are primarily between stationary parts, the single seal 36 (and corresponding seal 36a at the opposite end of the machine) existing adjacent both rotating and stationary parts adding very little to the overall rotating losses of the machine or to leakage of the air gap ambient out of its enclosure or leakage of the cooling fluid therein. It is to be particularly observed that with the arrangement proposed, there are no rotating seals between the stationary brush holders and their enclosure on the one hand, and the rotating commutator on the other, and thus there will be no tendency for the coolant blast to tend to suck the commutation enhancing medium out of the shielded collector enclosure. The two coolant systems, the one supplying coolant for the hollow inner shaft, and the other supplying coolant which passes over the collector enclosure and the frame, may be placed in series or in parallel or may be fed from independent sources of coolant fluid supply. The commutation ambient will in either event be independent of the nature of the coolant and, if desired, long brush life can be more readily assured since this ambient surrounding the armature and the commutator surface can be easily treated, as by a conditioning medium supplied from a wick and maintained over long periods, for good commutation entirely independent of the nature of the cooling medium. In this manner, disintegration of the brushes as a result of excessive friction due to lack of an adequate film can readily be avoided. With the arrangement of the invention, the rotational losses are reduced, efficient heat flow both radially inward and radially outward within the machine is obtained, and any gas (such as seat level air) in the collector enclosure and air gap lubricates the commutator but does not come in contact with the coolant fluid whether it be a blast of high altitude rarefied air of other gas or an insulating or conductive liquid used for cooling.

While we have illustrated and described particular embodiments of our invention, modifications will occur to those skilled in the art. We desire to be understood, therefore, that our invention is not to be limited to the particular arrangement described, and we intend in the appended claims to cover all modifications which do not depart from the true spirit and scope of our invention.

What we claim as new and desire to secure by Letters Patent of the United States is:

1. A liquid filled D.-C. aircraft generator having a gas filled air gap and a gas filled commutator and brush enclosure and comprising a stator frame, stator field poles having windings and secured in said frame, an armature having a winding and arranged to react with said field poles, a hollow quill shaft for supporting said armature, a commutator connected to said armature and supported by said quill shaft, first and second end shields affixed to said frame and supporting said quill shaft for rotation therein, said first end shield being configured and arranged around said commutator to act as a commutator shielding enclosure, a plurality of sealed brush holders held by said first end shield and having commutator brushes contacting said commutator within said enclosure, means for introducing a liquid rotor coolant within said hollow quill shaft and including an end cap secured to said first end shield and conduit means entering through said end cap, a spline portion for driving said quill shaft at one end thereof, said spline portion having axially extending holes therethrough for passing said liquid rotor coolant, a torque rod inner shaft for driving said splined portion and arranged within said quill shaft to provide a first chamber for said liquid coolant between said shafts in the vicinity of said commutator and a second chamber between said shafts in the vicinity of said armature, a generator mounting flange spaced axially outward of said second end shield, an annular baffle connecting said flange and said end shield and defining therebetween an end compartment for said liquid rotor coolant, conduit means for discharging said liquid rotor coolant through said annular baffle, means for introducing a liquid stator coolant over said first end shield and sealed brush holders and including a removable cover secured to portions of said first end shield and spaced from said sealed brush holders to provide a first stator coolant chamber, conduit means entering through said removable cover to said first stator coolant chamber, axial passages through a portion of said frame and communicating with said first stator coolant chamber, an enclosing wrapping spaced from and surrounding a portion of said frame to form a second stator coolant chamber communicating with said axial passages, conduit means for discharging said liquid stator coolant through said enclosing wrapping, and sealing means including gaskets for preventing intermixture of the gas in said commutator enclosure and air gap with said liquid rotor coolant and with said liquid stator coolant.

2. In a high altitude type dynamoelectric machine having a commutator and brush assembly and electrodynamically cooperating rotor and stator members, a first housing surrounding said commutator and said brush assembly and defining with said stator and rotor members an annular commutation chamber enclosing said commutator and brush assembly, a commutation conditioning medium in said commutation chamber, substantially gas-tight connections between said first housing and said stator member and between said first housing and said rotor member to prevent the leakage of said commutation conditioning medium out of said chamber, a second housing comprising an outer wrapper surrounding said first housing and defining therewith a cavity around said first housing, sealing connections between the ends of said second housing and said first housing, said cavity being adapted to receive a coolant for cooling said commutator and brush assembly independent of said commutation conditioning medium.

3. In an aircraft type dynamoelectric machine having a commutator and brush assembly and electrodynamically cooperating stator and rotor members, a first housing surrounding said commutator, said first housing having an opening formed in the wall thereof to provide access to said brush assembly, a brush capsule removably sealed to said wall in said opening, said first housing and said capsule defining with said stator and rotor members a commutation chamber enclosing said commutator and brush assembly and adapted to contain a commutation conditioning medium, substantially gas-tight connections between said first housing and said stator member and between said first housing and said rotor member, a second housing comprising a removable outer wrapper surrounding said first housing and defining therewith a cavity surrounding said first housing, sealing connections between the ends of said second housing and said first housing, said cavity being adapted to receive a coolant for cooling said commutator and brush assembly without intermixture of the coolant and the commutation conditioning medium.

4. In a dynamoelectric machine for use in a dry rarefied atmosphere and having a commutator and brush assembly and electrodynamically cooperating stator and rotor members, a first housing surrounding said commutator and brush assembly and defining with said stator and rotor members an annular commutation chamber enclosing said commutator and brush assembly, a commutation conditioning gaseous fluid in said commutation chamber, substantially gas-tight connections between said first housing and said stator member and between said first housing and said rotor member to prevent the leakage of said fluid out of said chamber, a second housing comprising a removable outer wrapper surrounding said first housing and defining therewith an annular cavity, sealing connections between each end of said wrapper and said first housing, a sleeve radially spaced from and surrounding at least a portion of said stator member to form a stator cooling chamber, communication means between said annular cavity and said stator coolant chamber whereby said annular cavity and said stator coolant chamber are adapted to receive a coolant for cooling said dynamoelectric machine independent of the fluid in said commutation chamber.

ALEC FISHER.
JAMES K. NEWELL.

References Cited in the file of this patent

UNITED STATES PATENTS

| Number | Name | Date |
|---|---|---|
| 1,443,644 | Nobukara | Jan. 30, 1923 |
| 1,684,168 | Bethel | Sept. 11, 1928 |
| 2,002,907 | Sessions | May 28, 1935 |
| 2,285,960 | Fechheimer | June 9, 1942 |
| 2,600,844 | Caputo | June 17, 1952 |

FOREIGN PATENTS

| Number | Country | Date |
|---|---|---|
| 194,847 | Switzerland | Mar. 16, 1938 |
| 296,301 | Germany | Jan. 31, 1917 |